Dec. 1, 1931. S. W. LASTOMIRSKY ET AL 1,834,718
PIE AND CAKE MARKER
Filed May 16, 1929

Inventors
Stephen W. Lastomirsky
and Michael P. Lastomirsky
By Wooster & Davis
Attorneys Patented Dec. 1, 1931

1,834,718

UNITED STATES PATENT OFFICE

STEPHEN W. LASTOMIRSKY AND MICHAEL P. LASTOMIRSKY, OF STRATFORD, CONNECTICUT

PIE AND CAKE MARKER

Application filed May 16, 1929. Serial No. 363,520.

This invention relates to a device for marking cakes and pies, and has for an object to provide a device for this purpose which is simple in construction so that it may be manufactured and sold at relatively low cost, which may be easily cleaned, and which is so constructed that it will not crush or press down the top crust of the pie or the top of a cake when cutting or marking it.

It is another object of the invention to provide a device in which the entire pie or cake may be marked off in equal portions at a single operation.

With the foregoing and other objects in view the invention consists in certain novel features of construction, combinations, and arrangements of parts as will be more fully disclosed in connection with the accompanying drawings, it, of course, being understood that various modifications and changes in the details of construction may be employed without departing from the principles of the invention.

In the drawings

Figure 3:
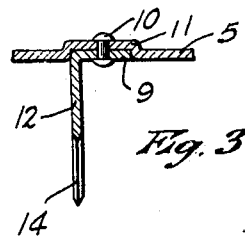
Fig. 3 is a detail section substantially on line 3—3 of Fig. 2.
Figure 4:
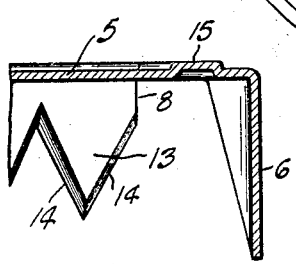
Fig. 4 is a detail section substantially on line 4—4 of Fig. 2.

In restaurants and hotels it is very desirable that pies and cakes be cut in equal portions and that a pie or cake of a given size be always cut into the same number of equal portions, and it is also desirable that the employees be able to do this quickly and accurately. Still further in cutting pies and cakes with ordinary knives the top crust of the pie or the top of the cake is apt to be crushed. We have provided a device which will give these advantages and over-come these objections, and have secured this result in a device which is of a very simple structure and may be manufactured and sold at relatively low cost. The device comprises a disc or plate 5 preferably of suitable metal such as aluminum, and in the form shown is circular in shape. It may be stamped from sheet metal and at its outer edge it is provided with any suitable number of ears or lugs 6. In the present showing there are four of these lugs, which, after the plate is stamped, are bent downwardly as shown to provide guides to engage the rim of a pie or pie plate 7 to properly guide the device in use. On the underside of this plate 5 are any desired number of cutters 8, the number depending on the number of portions into which the pie or cake is to be cut and of course, they are equally spaced so that the pie or cake will be marked in equal sized portions. These knives or cutters are preferably of angle or L-shape in cross-section as shown more clearly in Fig. 3. The base flange 9 is secured to the plate 5 by any suitable means such as rivets 10. It is preferred to press laterally the walls of the plate 5 as indicated at 11 to provide substantially radially extending grooves or recesses in which the flange 9 may be seated so that the flange 9 lies substantially flush with the surface of the plate, and the groove also assists in providing a more rigid mounting of the cutter or marker on the plate. The other portion 12 of this cutter or marker depends downwardly from the plate and is provided at its lower edge with pointed teeth 13 which are sharpened on their edges 14 to provide inclined knife edges as clearly indicated in Figs. 1 and 4. The portion 11 also strengthens and stiffens the plate, and it may be further stiffened and strengthened by similarly offsetting the plate adjacent the outer rim thereof as shown at 15.

The device is provided with any suitable handle for handling and manipulating it. In the present construction such a handle is shown at 18 secured to the center of the plate 5 by any suitable means such as the screws 16. To assist in securing the handle to the plate it is preferred to form at the center of the plate an offset as shown at 17 to provide a circular boss, and that the end of the handle be recessed to receive this boss, although it will be apparent that other means of securing the handle may be employed if desired.

It is to be noted that the guiding lugs or ears 6 should extend below the free ends of the teeth 13 so as to engage the rim of the pie or pie plate or the cake to be marked and properly center the device in use.

Figure 1:
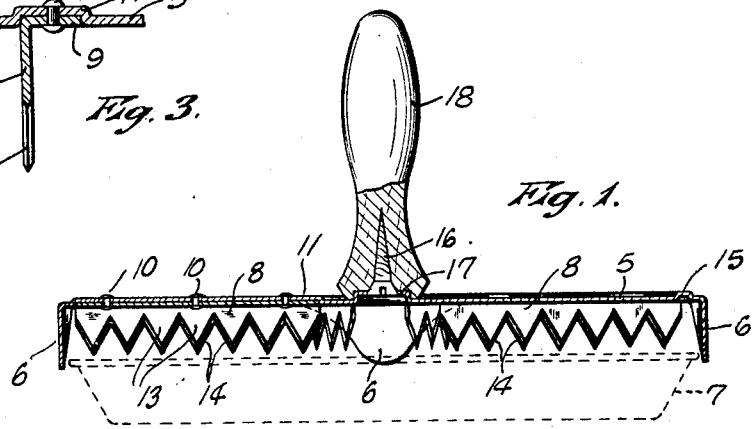
Fig. 1 is a section through the device substantially on line 1—1 of Fig. 2.
Figure 2:
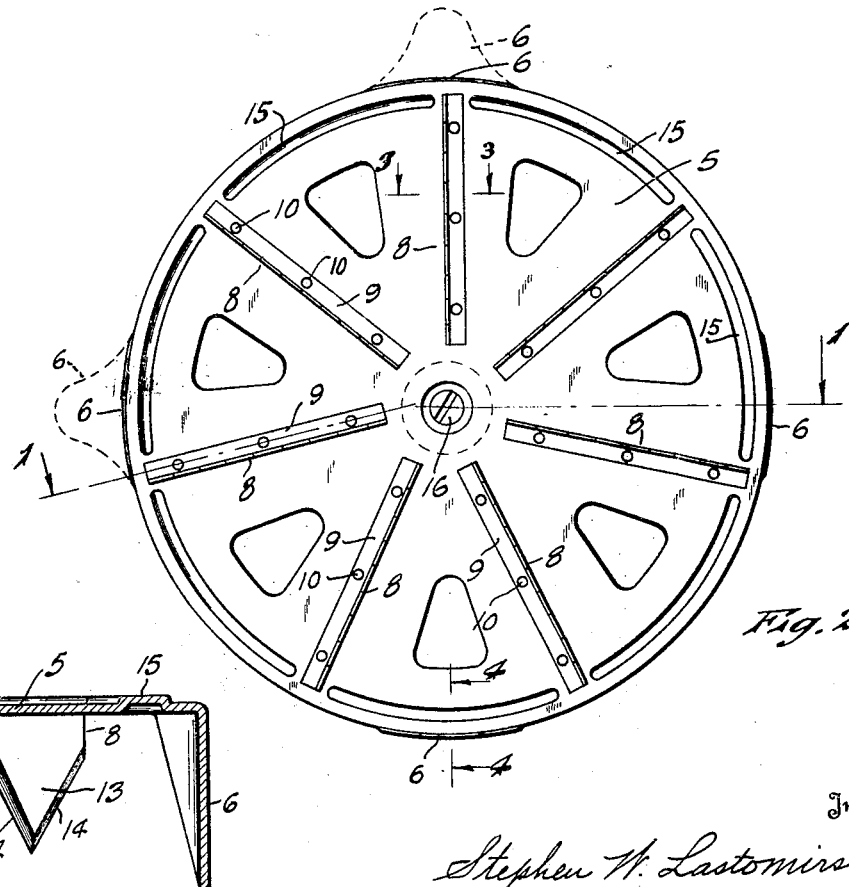
Fig. 2 is a bottom plan view thereof.

In operation the user merely places the device over the pie or cake to be marked as indicated in Fig. 1. Then by merely pressing downwardly all the knives 8 cut through the top crust of the pie or the top of the cake simultaneously, and due to the peculiar construction of the knives, that is, with the inclined cutting edges 14, they will readily pass through the top crust of the pie or the top of the cake without crushing it. When the device is removed these lines are left in the top of the cake or pie, and as the lines are already cut in the top, the operator may easily and quickly finish cutting the cake or pie into equal portions by means of an ordinary knife through these lines, and without crushing the pie or cake. It will be apparent that this operation of marking and cutting the top of the article is performed with a single operation, that the device is very simple in construction and may be easily cleaned. It is preferred to provide the plate with openings 19 between the cutters 8 as these permit the user of the device to observe the pie or cake being cut or marked and assists in keeping the device level so that it is not pressed too far into the pie or cake at one side. This is particularly important in cutting pies without top crusts or with meringues, or cakes with soft frostings, as they assist in preventing crushing of these tops.

Having thus set forth the nature of our invention, what we claim is:

In a pie and cake cutter and marker, a body comprising a metal plate provided with spaced downwardly extending integral guides at its edges to engage the edges of a pie or pie plate to guide the device and hold it central during downward movement, a plurality of radially extending upright cutters on the under side of said plate and each having its lower edge formed of a plurality of spaced, tapered, pointed teeth arranged with the points down and with the inclined side edges of the teeth formed of knife edges, said teeth extending substantially the depth of the cutters, and a handle secured on the top of the plate.

In testimony whereof we affix our signatures.

STEPHEN W. LASTOMIRSKY.
MICHAEL P. LASTOMIRSKY.